Jan. 10, 1950     G. J. JURISICH ET AL     2,494,044
MIXING VALVE

Filed May 21, 1946     2 Sheets-Sheet 1

Inventors
George J. Jurisich
William M. Ferguson
By Lyon & Lyon
Attorneys

Jan. 10, 1950　　　G. J. JURISICH ET AL　　　2,494,044
MIXING VALVE
Filed May 21, 1946　　　2 Sheets-Sheet 2
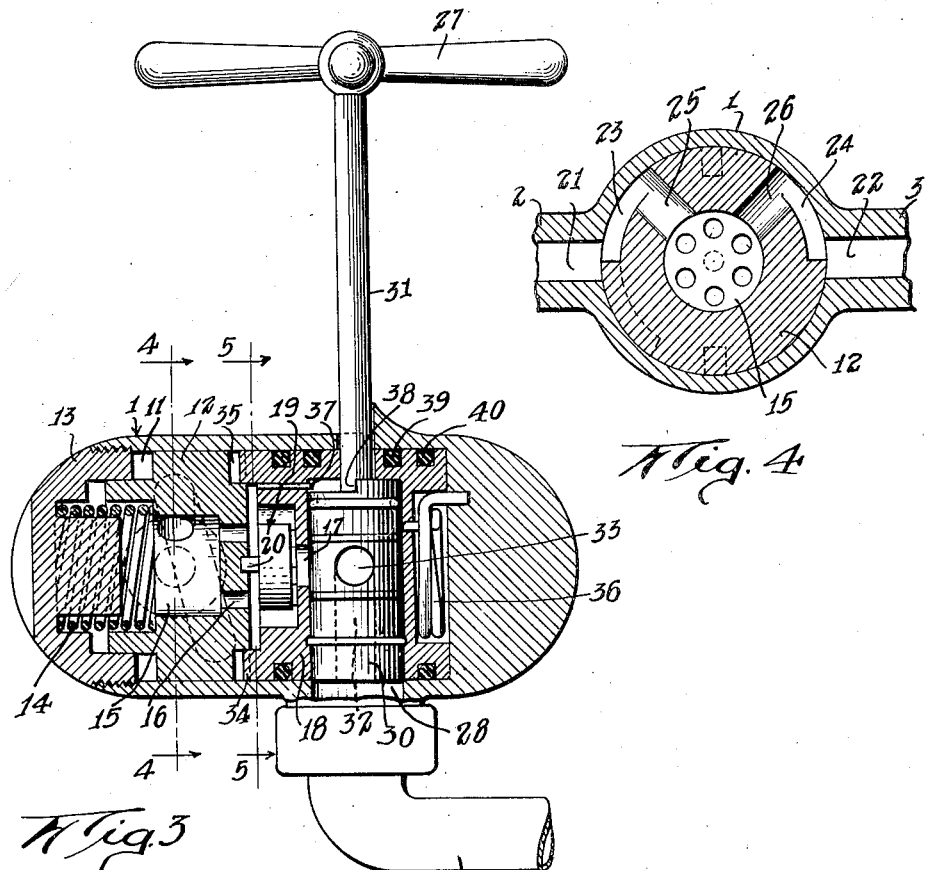
Fig. 3
Fig. 4
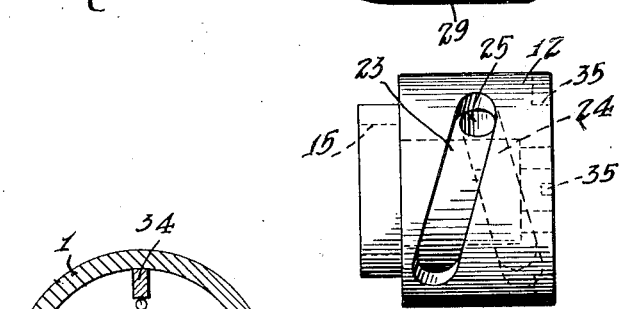
Fig. 6
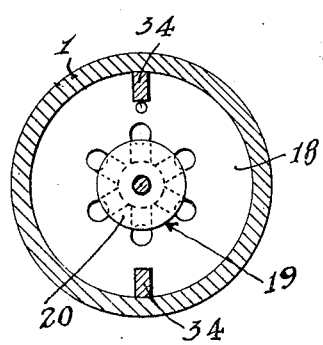
Fig. 5
Inventors
George J. Jurisich
William M. Ferguson
By Lyon & Lyon
Attorneys Patented Jan. 10, 1950

2,494,044

UNITED STATES PATENT OFFICE 2,494,044

MIXING VALVE

George J. Jurisich and William M. Ferguson, Los Angeles, Calif.

Application May 21, 1946, Serial No. 671,367

8 Claims. (Cl. 236—12)

This invention relates to mixing valves and more particularly to a valve which is operative to control both the temperature and volume of the water flowing therefrom while at the same time maintaining the temperature of the outflowing water substantially constant independent of the fluctuation of the supply of either the hot or cold water.

It is an object of this invention to provide a mixing valve which is of the single stem actuation type including a single actuating element for controlling the proportions and volume of hot and cold water which are mixed in the valve and emitted through the spout thereof.

Another object of this invention is to provide a mixing valve of the above stated type which is provided with a thermostatic control means operative to vary within limits the water supply to the mixing chamber in accordance with the temperature of the water within the mixing chamber so as to maintain a substantially constant temperature of the water within the mixing chamber valve irrespective of fluctuations in the hot or cold water supply to the mixing valve.

Another object of this invention is to provide a mixing valve which is provided with a single handle for operation thereof to control the temperature and volume of water emitted from the valve and wherein thermostatic means are provided for controlling the mixing of the water in the mixing chamber of the valve in accordance with fluctuations of the hot and cold water supply thereto.

Other objects and advantages of this invention it is believed will be apparent from the following detailed description of a preferred embodiment thereof as illustrated in the accompanying drawings.

In the drawings:

Figure 3 is a sectional elevation taken substantially on the line 3—3 of Figure 1.

Figure 4 is a sectional end view taken substantially on the line 4—4 of Figure 3.

Figure 5 is a sectional end elevation taken substantially on the line 5—5 of Figure 3.

Figure 6 is a detached elevation of the mixing chamber plug.

Figures 1, 2:
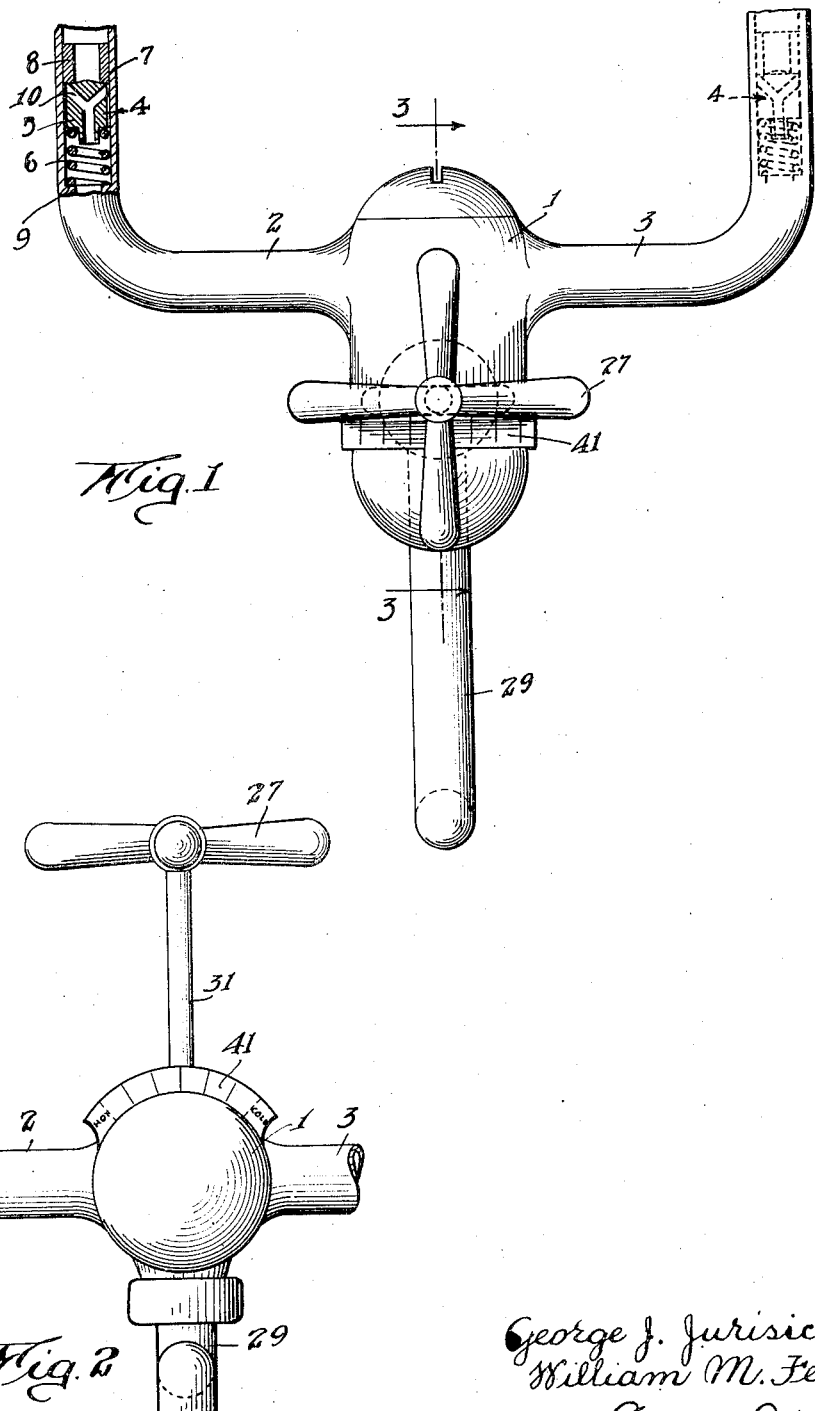
Figure 1 is a top plan view partially in horizontal section of the mixing valve embodying our invention.
Figure 2 is a fragmental front elevation thereof.

In the preferred embodiment of our invention as illustrated in the accompanying drawings, 1 indicates a valve body having a hot water branch 2 and a cold water branch 3. In order to retard flow of water between the said branches in the event of by-passing the valve structure within the body 1, I provide check valves 4 in each said branch. These check valves may be of any suitable or desirable construction and are herein illustrated as including a ported valve head 5 urged by means of a spring 6 towards a seat 7 provided by a sleeve 8 positioned within the said branch. The spring 6 engages the head 5 at one end and a stop shoulder 9 at its opposed ends and acts to urge the head toward the seat 7. The head is provided with a fluid passage or port 10 through which the water flows when the pressure of the water within the branches 2 or 3 beyond the check valves 4 exceeds the pressure of water effective on the opposite face of the head 5. In this manner intermixing of hot and cold water within the mains is prevented due to flow from one branch to the other in event of leakage through the mixing valve.

The body 1 provides a mixing chamber 11 within which the ported plug 12 is positioned to control the proportions of hot and cold water admitted thereto. The body 1 is provided with a cap 13 which is threaded thereto and interposed between the cap 13 and the plug 12 is a spring 14 which yieldably urges the plug 12 axially of the body 1. The plug 12 is provided with an axial mixing passage 15 from which the water leaves through a plurality of ports 16 passing to the volume control port 17 formed in the rotor cage 18.

Positioned between the rotor cage 18 and the plug 12 is a thermostat 19 of the expansion type. The thermostat is of usual form providing a centrally disposed rod 20 which moves inward and outward upon expansion of the element of the thermostat and opposes the thrust imposed upon the plug 12 by the spring 14. Thus the plug 12 is moved axially of the body 1 with relation to the hot and cold water inlets 21 and 22 formed through the branches 2 and 3, respectively. The hot and cold water inlet ports 23 and 24 are formed in inclined relation on the surface of the plug 12 and extend along the periphery thereof as viewed in Figure 4 to terminate in radial ports 25 and 26 leading to the central mixing chamber 15. As the plug 12 is rotated around its axis in the positions of registry with, and out of registry from, the hot and cold water inlets 22, the proportion of the hot and cold water admitted to the central chamber 15 will be determined. These ports 23 and 24 as viewed in Figure 6 are inclined upon the surface of the plug 12, and axial movement of the plug within the mixing chamber 11 will determine the degree of opening and therefore the proportion of hot and cold water admitted to the chamber 15 in accordance with any previous setting thereof by actuation of the handle 27 to rotate the plug 12. Thus fluctuations of the supply of hot or cold water in the branches 2 and 3 will be compensated for by change of temperature within the mixing chamber 11 causing the thermostat 19 to move the plug 12 axially of the body 1 to change proportions of hot and cold water admitted to the chamber 15, maintaining a substantially constant temperature of water within the mixing chamber in accordance with the position and setting of the thermostat 19.

In order to rotate the plug 12 and to control the volume of water permitted to pass from the valve outlet 28 and through the outlet spout 29, we have provided the following construction: The rotor cage 18 has mounted therein a rotor 30 which is secured in non-rotatable relation to the stem 31 to the upper end of which there is secured the handle 27. The rotor is provided with an axial discharge port 32 and a radial inlet port 33 so that on rotation of the rotor 30 within the rotor cage 18 the volume of water permitted to pass from the mixing chamber 11 into the inlet port 33 will be determined by the relative position of the port 33 with reference to the rotor cage inlet port 17.

The rotor cage is keyed to the plug 12 by means of key sections 34 which fit within corresponding key recesses 35 formed in the inner face of the plug 12 so that as the handle 27 is moved or rocked in the direction around the axis of the body 1, the plug 12 will be rotated to determine the position of the ports 23 and 24 with relation to the inlets 21 and 22 formed in the branches 2 and 3, respectively.

A spring 36 is positioned between the body 1 and the rotor cage 18 if desired in order to provide for the returning of the cage to an intermediate position to avoid the possibility of scalding water being accidentally passed through the valve. A limit stop pin 37 is positioned within the cage 18 to engage a stop shoulder 38 formed at the end of the rotor 30 in order to limit the rotation of the rotor.

Suitable sealing rings 39 and 40 are provided in sealing ring recesses formed in the rotor to seal the rotor to the body 1. A suitable dial 41 is formed upon the body 1 to indicate the hot and cold positions of the stem 31 and hence the rotation of the plug 12. The degree of swing of the stem 31 and hence of rotation of the plug 12 within the body 1 is sufficient to permit all hot water to pass from the inlet 21 through the ports 23 and 25 to the mixing chamber 15, or contrariwise, to admit all cold water through the corresponding ports from the cold water branch 3. In case of admission of all hot or cold water to the mixing chamber 11, the thrust created by the thermostat 19 is insufficient to overcome this degree of movement of the plug 12. It will thus be observed that the thermostat 19 is only effective within the range between the extreme positions of the plug 12 and to maintain a constant water temperature in accordance with the mixing of the water within the mixing chamber 11. In this limited range the thermostat will operate to shift the plug 12 axially of the body 1 to maintain a substantially constant water temperature as the supply of hot and cold water to the mixing chamber fluctuates within the branches 2 and 3.

Having fully described our invention, it is to be understood that we do not wish to be limited to the details herein set forth, but our invention is of the full scope of the appended claims.

We claim:

1. A mixing valve, comprising: a body having a mixing chamber therein, hot and cold water inlets and an outlet communicating with said mixing chamber, a rotatably mounted ported plug positioned within said mixing chamber, the ported plug having proportioning ports adapted upon rotation of the plug within the mixing chamber with relation to the hot and cold water inlets to proportion the amounts of hot and cold water admitted thereto; a rotatable ported rotor cage in said mixing chamber in coaxially disposed relation to said ported plug; a ported rotor transversely positioned within said rotor cage and controlling communication with said body outlet; means for rotating the rotor about an axis normal to the axis of said rotor cage to determine the volume of water permitted to pass from the mixing chamber through the body outlet; and means operatively connecting the rotor cake with said ported plug, said rotor rotating means being arcuately movable about the axis of said rotor cage to cause like movement of said rotor cage and ported plug.

2. A mixing valve, comprising: a body having a mixing chamber therein, hot and cold water inlets and an outlet communicating with said mixing chamber, a rotatably mounted ported plug positioned within said mixing chamber, the ported plug having proportioning ports adapted upon rotation of the plug within the mixing chamber with relation to the hot and cold water inlets to proportion the amounts of hot and cold water admitted thereto; a rotatable ported rotor cage in said mixing chamber in coaxially disposed relation to said ported plug; a ported rotor transversely positioned within said rotor cage and controlling communication with said body outlet; means for rotating the rotor about an axis normal to the axis of said rotor cage to determine the volume of water permitted to pass from the mixing chamber through the body outlet; means operatively connecting the rotor cage with said ported plug, said rotor rotating means being arcuately movable about the axis of said rotor cage to cause like movement of said rotor cage and ported plug; and a thermostatic means positioned within the mixing chamber and positioned to engage said ported plug and shift said ported plug axially with relation to the hot and cold water inlets so as to maintain a substantially constant temperature of water within the mixing chamber at a particular setting of the ported plug therein.

3. A mixing valve comprising: a valve body defining a cylindrical cavity having opposed inlets and an axially displaced outlet; a proportioning valve arcuately movable about the axis of said cavity and ported to regulate the relative flow of liquids into said cavity; a drive member for said proportioning valve and likewise arcuately movable about the axis of said cavity and covering said outlet, said drive member having a transverse bore and ported to provide communication from said proportioning valve to said outlet; a volume control valve journaled in said transverse bore to control flow through said drive member; a handle for said volume control valve extending through a wall of said cavity, said valve body being slotted to permit arcuate movement of said handle for effecting corresponding arcuate movement of said drive member and proportioning valve.

4. A mixing valve comprising: a valve body defining a cylindrical valve chamber intersected by a pair of inlet ports and an outlet port axially displaced from said inlet ports; a plug structure journaled in said valve chamber and defining proportioning valve ports co-operating with said inlet valves and a transverse bore communicating with said outlet, and passages between said proportioning valve ports and said transverse bore; a volume regulating valve journaled in said transverse bore to control flow to said outlet port; and an operating stem extending from said volume regulating valve through the wall of said valve chamber, said valve body being slotted to permit arcuate movement of said stem about the axis of said plug structure to open and close said proportioning valve ports.

5. A mixing valve comprising: a valve body defining a cylindrical valve chamber intersected by a pair of inlet ports and an outlet port axially displaced from said inlet ports; a plug structure including a pair of coaxial rotatable plug elements, the first of said plug elements being arranged for axial movement and defining a pair of proportioning valve ports movable axially and arcuately relative to said inlet ports to regulate with either movement the proportionate flow through said inlet ports, the second of said plug elements defining an outlet port registering with the outlet port of said valve body, both of said plug elements defining passageways communicating between said proportioning valve ports and said outlet port, and coupled for coordinated rotation; and a temperature sensitive element disposed to move said first plug element axially.

6. A mixing valve comprising: a valve body defining a cylindrical valve chamber intersected by a pair of inlet ports and an outlet port axially displaced from said inlet ports; a plug structure including a pair of coaxial rotatable plug elements, the first of said plug elements being arranged for axial movement and defining a pair of proportioning valve ports movable axially and accurately relative to said inlet ports to regulate with either movement the proportionate flow through said inlet ports, the second of said plug elements defining an outlet port registering with the outlet port of said valve body, both of said plug elements defining passageways communicating between said proportioning valve ports and said outlet port, and coupled for coordinated rotation; a temperature sensitive element disposed to move said first plug element axially; a volume regulating valve journaled in said second plug element on an axis transverse to said valve chamber; and a handle for said volume control valve extending through a wall of said cavity, said valve body being slotted to permit arcuate movement of said handle for effecting corresponding arcuate movement of said second plug element and proportioning valve.

7. A mixing valve, comprising: a body defining a valve chamber having hot and cold water inlets and a mixed water outlet; coaxially related driven and driving rotors in said valve chamber, the driven rotor having proportioning ports communicating with said inlets, the driving rotor having an outlet port communicating with said outlet; and means rotatable about an axis transverse to said driving rotor to control the volume of flow therethrough, and arcuately movable to effect like arcuate movement of said driving and driven rotors, thereby to proportion the flow of water into said rotors.

8. A mixing valve, comprising: a body defining a valve chamber having hot and cold water inlets and a mixed water outlet; coaxially related driven and driving rotors in said valve chamber, the driven rotor having proportioning ports communicating with said inlets, the driving rotor having an outlet port communicating with said outlet; means rotatable about an axis transverse to said driving rotor to control the volume of flow therethrough, and arcuately movable to effect like arcuate movement of said driving and driven rotors, thereby to proportion the flow of water into said rotors, said driven rotor also being axially movable relative to said driving rotor to effect proportioning of said hot and cold water; and a thermostat element interposed between said driving and driven rotors to expand and contact thereby to cause axial movement of said driven rotor.

GEORGE J. JURISICH,
WILLIAM M. FERGUSON.

REFERENCES CITED

The following references are of record in the file of this patent:

UNITED STATES PATENTS

| Number | Name | Date |
|---|---|---|
| 1,504,498 | Petcher | Aug. 12, 1924 |
| 1,615,730 | Vallier | Jan. 25, 1927 |
| 1,940,090 | Hetherington | Dec. 19, 1933 |
| 2,110,952 | Glenn | Mar. 15, 1938 |
| 2,204,257 | Powers | June 11, 1940 |